(12) United States Patent
Guo et al.

(10) Patent No.: US 12,541,245 B2
(45) Date of Patent: Feb. 3, 2026

(54) MAN-MACHINE INTERACTIVE METHOD AND APPARATUS FOR LONG-ENDURANCE OPERATION BASED ON DYNAMIC TIME PRESSURE

(71) Applicant: ZHEJIANG LAB, Hangzhou (CN)

(72) Inventors: Rui Guo, Hangzhou (CN); Quanheng Song, Hangzhou (CN); Danqing Hu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 26 days.

(21) Appl. No.: 18/686,427

(22) PCT Filed: Apr. 28, 2023

(86) PCT No.: PCT/CN2023/091655
§ 371 (c)(1),
(2) Date: Feb. 25, 2024

(87) PCT Pub. No.: WO2024/221416
PCT Pub. Date: Oct. 31, 2024

(65) Prior Publication Data
US 2025/0251779 A1 Aug. 7, 2025

(30) Foreign Application Priority Data
Apr. 24, 2023 (CN) .......................... 202310444556.9

(51) Int. Cl.
*G06F 3/01* (2006.01)

(52) U.S. Cl.
CPC .................. *G06F 3/011* (2013.01)

(58) Field of Classification Search
CPC ......... G06F 3/011; A61B 5/162; G06V 20/59; G06V 20/597; G09B 9/08–50;
(Continued)

(56) References Cited

U.S. PATENT DOCUMENTS 7,435,227 B2 * 10/2008 Farbos .................. G08B 21/06
340/576
10,376,198 B1 * 8/2019 Flaherty-Woods .........................
A61B 5/1103
(Continued)

FOREIGN PATENT DOCUMENTS

CN 108303886 7/2018
CN 109145485 1/2019
(Continued)

*Primary Examiner* — Stephen G Sherman
(74) *Attorney, Agent, or Firm* — Jiwen Chen; Joywin IP Law PLLC

(57) ABSTRACT

The present disclosure provides a man-machine interactive method and apparatus for a long-endurance operation based on a dynamic time pressure, belonging to the technical field of man-machine ergonomics. The method specifically includes: constructing a maximum performance-time pressure-time function curve based on a performance-time pressure function curve corresponding to a long-endurance operation; calculating a response time of a next long-endurance operation based on a historical response time of man-machine interaction after the current long-endurance operation is completed; calculating a maximum performance value corresponding to an initial time of the next long-endurance operation and a time pressure corresponding to the maximum performance value based on the maximum performance-time pressure-time function curve; and calculating an optimal reserved time corresponding to the maximum performance value based on the response time of the next long-endurance operation and the time pressure. The method and the apparatus can improve the performance level of the man-machine interaction during the long-endurance operation, and reduce human errors caused by cumulative fatigue and too short reserved time of the operation, thereby improving the flight safety.

5 Claims, 5 Drawing Sheets

(58) Field of Classification Search
CPC ............ Y02D 10/00; G06Q 10/06393; G06Q 10/06398; G06Q 50/40
See application file for complete search history.

(56) References Cited

U.S. PATENT DOCUMENTS

| | | | |
|---|---|---|---|
| 12,094,316 B2* | 9/2024 | Myers .................. | G06V 40/174 |
| 2016/0189080 A1 | 6/2016 | Liao et al. | |
| 2017/0210483 A1* | 7/2017 | Hamblin ................ | G07C 5/008 |
| 2020/0183382 A1* | 6/2020 | Schwindt ............. | G06V 20/597 |
| 2020/0210859 A1* | 7/2020 | Graf ........................ | G06F 3/011 |
| 2020/0290740 A1* | 9/2020 | Rangan .................. | G06V 40/18 |
| 2023/0356842 A1* | 11/2023 | Rangan .................. | G06V 40/18 |

FOREIGN PATENT DOCUMENTS

| | | |
|---|---|---|
| CN | 112016786 | 12/2020 |
| CN | 115115270 | 6/2022 |

\* cited by examiner

Before optimization

After optimization

MAN-MACHINE INTERACTIVE METHOD AND APPARATUS FOR LONG-ENDURANCE OPERATION BASED ON DYNAMIC TIME PRESSURE

This is a U.S. national stage application of PCT Application No. PCT/CN2023/091655 under 35 U.S.C. 371, filed Apr. 28, 2023 in Chinese, claiming priority of Chinese Application No. 202310444556.9, Apr. 24, 2023, all of which are hereby incorporated by reference.

FIELD OF TECHNOLOGY

The present disclosure belongs to the technical field of man-machine ergonomics, and specifically relates to a man-machine interactive method and apparatus for a long-endurance operation based on a dynamic time pressure.

BACKGROUND TECHNOLOGY

The modern cockpit missions are mostly completed through collaborative interaction between a man-machine interface and a pilot, and the mission decision-making of the pilot depends 100% on the presentation and control of a man-machine interactive system. During the long-endurance operation, it is difficult for long-term vigilance of cognitive awareness of the pilot, and thus human errors in the cognitive process seriously affects the flight safety. In order to avoid the human errors during the long-endurance operation, the issue of cognitive overload of the pilot due to mission interaction needs to be reduced from the source.

During the conventional long-endurance operation, the reserved time of the system is fixed, and the pilot has cognitive difficulties such as distraction after a long time of operation, which leads to gradual increase of response time of correct operation. When the response time continues to increase and exceeds the reserved mission processing time of the system, serious human errors will be caused to affect the flight safety.

A man-machine interactive system for a cockpit based on mental fatigue monitoring is disclosed in the patent No. CN114742090A, in which a cockpit man-machine interactive module is used to acquire information of a pilot, identify mental fatigue, and give a fatigue warning, so as to reduce the error operation and probability of the pilot. This is an interactive means of external intervention and has the following disadvantages:

a. There will be a certain error in detection of fatigue indexes, and the fatigue classification level is set by people to be normal, mild, and severe. There must be systematic errors in such a determination process, and with the passage of pilot's working time, the accumulated errors will be gradually increased, thus affecting the determination of fatigue warning.

b. The method of external intervention cannot fundamentally solve the problem of pilot's cognitive load, and strong reminding interaction will also cause unknown consequences.

An anti-fatigue driving control system based on man-machine interaction is disclosed in the patent No. CN112017404A, in which a fatigue level is determined based on used pilot information, and corresponding mission commands are generated based on the fatigue level and executed. While this method combines missions with the fatigue level, the necessary missions that need to be executed will not be unnecessarily executed because of fatigue during actual flight, so this technical solution is not applicable during the actual flight.

SUMMARY OF THE INVENTION

In view of the above, an object of the present disclosure is to provide a man-machine interactive method and apparatus for a long-endurance operation based on a dynamic time pressure, which can effectively reduce the cognitive load of pilots, reduce human errors during the long-endurance operation on the basis of conforming to a human factors engineering theory, and improve the performance level of the pilots.

To achieve the above object of the present disclosure, a man-machine interactive method for a long-endurance operation based on a dynamic time pressure provided by an embodiment includes the following steps:

constructing a maximum performance-time pressure-time function curve based on a performance-time pressure function curve corresponding to a long-endurance operation;

calculating a response time of a next long-endurance operation based on a historical response time of man-machine interaction after the current long-endurance operation is completed;

calculating a maximum performance value corresponding to an initial time of the next long-endurance operation and a time pressure corresponding to the maximum performance value based on the maximum performance-time pressure-time function curve; and calculating an optimal reserved time corresponding to the maximum performance value based on the response time of the next long-endurance operation and the time pressure.

In one embodiment, the constructing a maximum performance-time pressure-time function curve based on a performance-time pressure function curve corresponding to a long-endurance operation includes:

sampling different time points on a time axis of the long-endurance operation, and constructing a performance-time pressure function curve corresponding to each of the sampled time points during the long-endurance operation;

calculating a maximum performance value corresponding to the sampled time point and a time pressure corresponding to the maximum performance value based on the performance-time pressure function curve; and based on the maximum performance values corresponding to all the sampled time points and the time pressures, constructing the maximum performance-time pressure-time function curve with the time as an abscissa, the time pressures as another abscissa, and the maximum performance values as an ordinate.

In one embodiment, the calculating a response time of a next long-endurance operation based on a historical response time of man-machine interaction comprises:

calculating an average response time based on the historical response time;

calculating a corrected time based on a response time of the current long-endurance operation and a response time of a previous long-endurance operation; and calculating the response time of the next long-endurance operation based on the average response time and the corrected time.

In one embodiment, the calculating a corrected time based on a response time of the current long-endurance operation and a response time of a previous long-endurance operation includes:

using a difference between the response time of the current long-endurance operation and the response time of the previous long-endurance operation as the corrected time.

In one embodiment, the method further includes: updating a reserved time corresponding to the long-endurance operation in an interactive system based on the optimal reserved time.

To achieve the above objective of the present disclosure, an embodiment further provides a man-machine interactive apparatus for a long-endurance operation based on a dynamic time pressure, including a curve construction module, a response time calculation module, a time pressure calculation module, and an optimal reserved time calculation module, where the curve construction module is configured to construct a maximum performance-time pressure-time function curve based on a performance-time pressure function curve corresponding to a long-endurance operation;

the response time calculation module is configured to calculate a response time of a next long-endurance operation based on a historical response time of man-machine interaction after the current long-endurance operation is completed;

the time pressure calculation module is configured to calculate a maximum performance value corresponding to an initial time of the next long-endurance operation and a time pressure corresponding to the maximum performance value based on the maximum performance-time pressure-time function curve; and the optimal reserved time calculation module is configured to calculate an optimal reserved time corresponding to the maximum performance value based on the response time of the next long-endurance operation and the time pressure.

In one embodiment, the curve construction module for constructing a maximum performance-time pressure-time function curve based on a performance-time pressure function curve corresponding to a long-endurance operation is specifically configured to:

sample different time points on a time axis of the long-endurance operation, and construct a performance-time pressure function curve corresponding to each of the sampled time points during the long-endurance operation;

calculate a maximum performance value corresponding to the sampled time point and a time pressure corresponding to the maximum performance value based on the performance-time pressure function curve; and based on the maximum performance values corresponding to all the sampled time points and the time pressures, construct the maximum performance-time pressure-time function curve with the time as an abscissa, the time pressures as another abscissa, and the maximum performance values as an ordinate.

In one embodiment, the response time calculation module for calculating a response time of a next long-endurance operation based on a historical response time of man-machine interaction is specifically configured to:

calculate an average response time based on the historical response time;

calculate a corrected time based on a response time of the current long-endurance operation and a response time of a previous long-endurance operation; and calculate the response time of the next long-endurance operation based on the average response time and the corrected time.

To achieve the above objective of the present disclosure, an embodiment further provides a computing device, including a memory having an executable code stored therein, and one or more processors, where when executing the executable code, the one or more processors are configured to implement the above man-machine interactive method for a long-endurance operation based on a dynamic time pressure.

To achieve the above objective of the present disclosure, an embodiment further provides a computer-readable storage medium, having a program stored thereon, where when the program is executed by a processor, the above man-machine interactive method for a long-endurance operation based on a dynamic time pressure is implemented.

Compared with the prior art, the present disclosure has at least the following beneficial effects:

The maximum performance-time pressure-time function curve is constructed based on the performance-time pressure function curve and can determine the maximum performance values corresponding to the time points and the time pressures corresponding to the maximum performance values more quickly. The time points are dynamic during the long-endurance operation, so the obtained time pressures are also dynamic. The optimal reserved time corresponding to the maximum performance value is calculated based on the dynamic time pressure, which improves the average performance level of the man-machine interaction during the long-endurance operation, and reduces human errors caused by cumulative fatigue and too short reserved time, thereby improving the flight safety.

BRIEF DESCRIPTION OF THE DRAWINGS

To illustrate the technical solutions in the embodiments of the present disclosure or in the prior art more clearly, the accompanying drawings that need to be used in the description of the embodiments or the prior art will be briefly described below. Apparently, the accompanying drawings in the description below merely illustrate some embodiments of the present disclosure. Those of ordinary skill in the art may also derive other accompanying drawings from these accompanying drawings without creative efforts.

DESCRIPTION OF THE EMBODIMENTS

To make the objective, the technical solutions and advantages of the present disclosure clearer, the present disclosure is further described in detail below in conjunction with the accompanying drawings and the embodiments. It should be understood that the specific embodiments described herein are merely used to explain the present disclosure, but not to limit the scope of protection of the present disclosure.

In order to solve the problem that the flight safety is affected due to serious human errors caused by fatigue accumulation of long-endurance operators and fixed reserved time periods, embodiments provide a man-machine interactive method and apparatus for a long-endurance operation based on a dynamic time pressure. The cognitive process of a pilot during the long-endurance operation is analyzed based on a time pressure definition and a corresponding relationship between the time pressure and the performance, and a time-performance curve is optimized using the designed dynamic time pressure to maximize the performance of each time point on a time axis during the long-endurance operation, that is, to obtain the maximum performance based on dynamic time pressure regulation on the time axis. The object is to reduce the potential risk of human errors by using a time pressure effect of decision-making, that is, an output relationship between the time pressure and the behavior performance of the pilot, so as to improve the overall operational performance of man-machine interaction.

Figure 1:
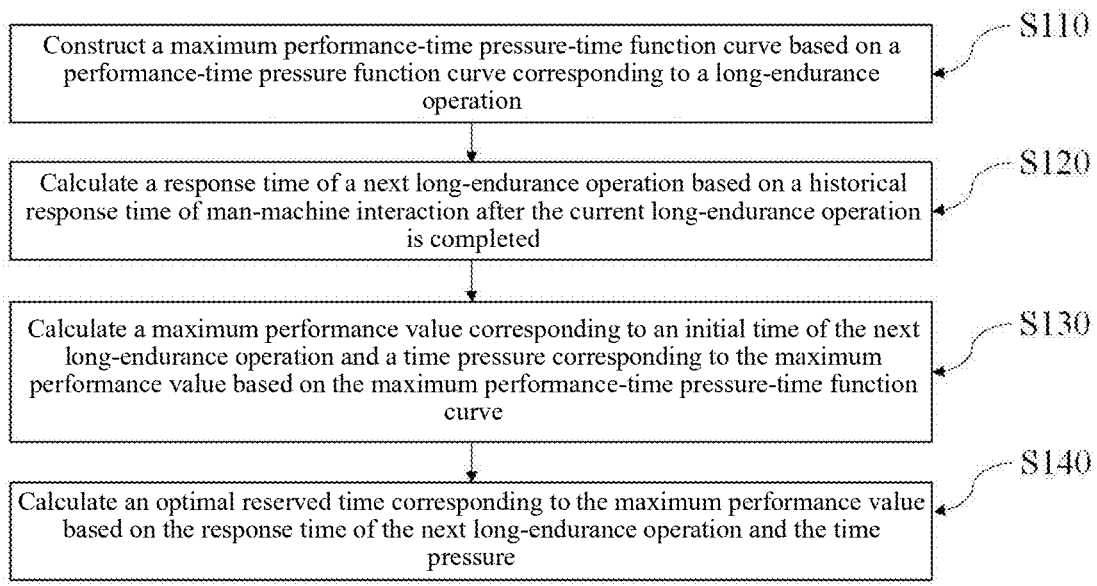
FIG. 1 is a flowchart of a man-machine interactive method for a long-endurance operation based on a dynamic time pressure provided by an embodiment.

FIG. 1 is a flowchart of a man-machine interactive method for a long-endurance operation based on a dynamic time pressure provided by an embodiment. As shown in FIG. 1, a man-machine interactive method for a long-endurance operation based on a dynamic time pressure provided by an embodiment includes the steps below.

In S110, a maximum performance-time pressure-time function curve is constructed based on a performance-time pressure function curve corresponding to a long-endurance operation.

The time pressure belongs to the category of work pressure. For a given long-endurance operational mission, a decision maker feels the existence of pressure equal to time in the process of completing the operational mission, which is called the time pressure. The time pressure is a comprehensive index, which comprehensively reflects the adequacy or lack of a mission time, mission data, and the complexity of the mission, that is, which can show the cognitive load of a pilot during the operation. The shorter the specified time is, the more complex the mission is, and the higher the time pressure is, otherwise, the lower the time pressure is.

Figure 2:
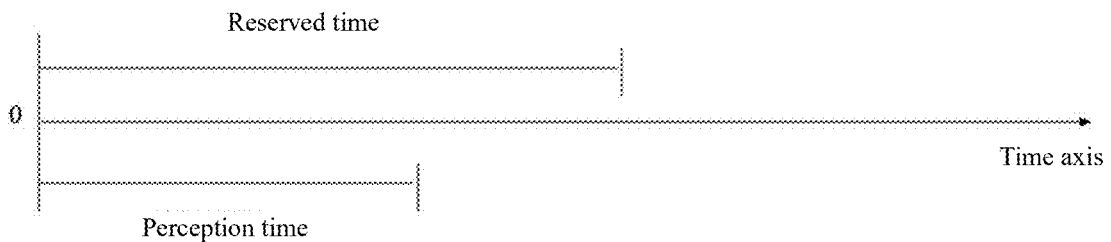
FIG. 2 is a schematic diagram of a time pressure provided by an embodiment.

As shown in FIG. 2, the time pressure can be measured by a ratio of, a response time required for the pilot to perceive, to a reserved time, that is, a certain moment t on a time axis is taken, and the time pressure is calculated according to a formula for the time pressure definition: $T^*=t/T$, where $T^*$ represents the time pressure, t represents the response time, namely, the time required from the process of receiving external information to the process of making a decision, and T represents the reserved time, namely, the available time. All the times can be in seconds.

According to the effect of the time pressure, the time pressure can be used as one index to examine operational states of the pilot in different operational missions. In order to improve the operational performance, the operational time pressure of the pilot should be controlled to a certain extent to ensure the flight safety.

Figure 3:
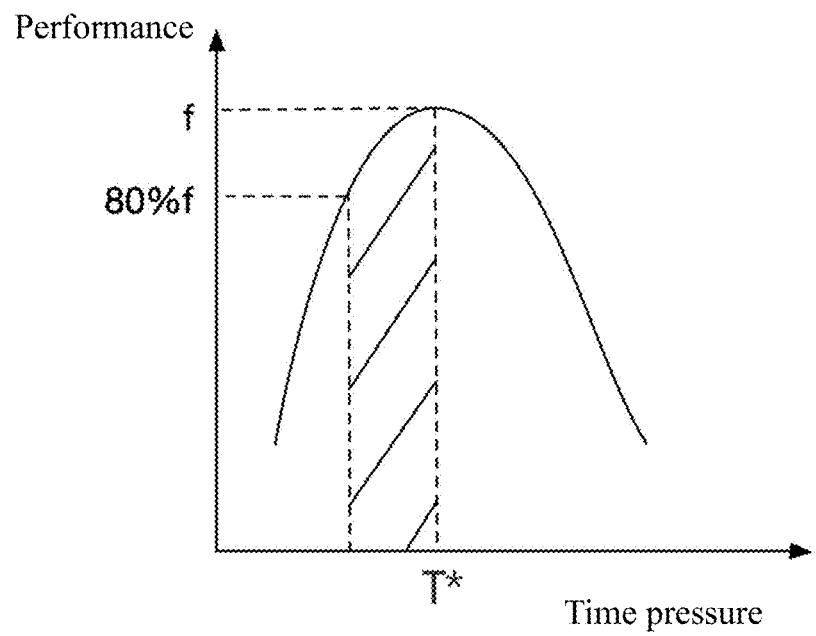
FIG. 3 is a diagram of a performance-time pressure curve provided by an embodiment.

A performance-time pressure function curve as shown in FIG. 3 represents an output relationship between the time pressure and the behavior performance of the pilot. In a case where the operational mission remains unchanged, the performance of the pilot at a certain time point presents an "inverted U-shaped" approximate function with the change of the time pressure. That is, the faster the time pressure on an abscissa axis increases, the earlier a maximum performance value on an ordinate occurs. However, a high-performance interval decreases.

In order to reduce the time pressure of the pilot at a certain time point, the available time of the pilot can be prolonged or the time required for the pilot to perceive can be shortened. During the long-endurance man-machine interaction, the available time of the pilot in each operational mission is generally a fixed value. However, the response time of the pilot will fluctuate with external factors and the situational awareness level of the pilot himself, which reduces the average work efficiency of the pilot, thereby causing human errors.

Based on the above definition of the performance-time pressure function curve, in this embodiment, the process of constructing a maximum performance-time pressure-time function curve based on a performance-time pressure function curve corresponding to a long-endurance operation includes the steps below.

In (a), different time points are sampled on a time axis of the long-endurance operation, and a performance-time pressure function curve corresponding to each of the sampled time points during the long-endurance operation is constructed.

Figure 4:
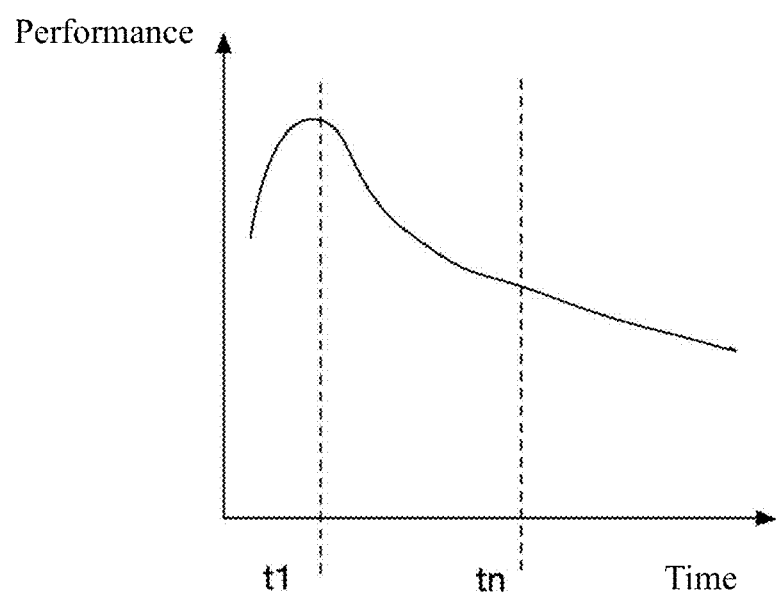
FIG. 4 is a diagram of a performance-time curve provided by an embodiment.

In this embodiment, based on a diagram of a performance-time curve as shown in FIG. 4, the different time points are used on the time axis to construct the performance-time pressure function curve corresponding to each sampled time point during the long-endurance operation, and each performance-time pressure function curve presents an approximately quadratic function based on a time pressure effect of decision-making.

In (b), a maximum performance value corresponding to the sampled time point and a time pressure corresponding to the maximum performance value are calculated based on the performance-time pressure function curve.

For each sampled time point t, the performance-time pressure function curve corresponding to the sampled time point t is set as $f=a(t)T^{*2}+b(t)T^*+c(t)$, where $a(t)=-nt^3$, $b(t)=met$, and both n and m are constant values. The coefficients $a(t)$ and $b(t)$ are transformed into functions with respect to t by introducing n and m, that is, the time pressure value corresponding to the solved maximum performance is transformed into a function with respect to t. The maximum performance value and the pressure time corresponding to the maximum performance are obtained by solving the function.

In (c), based on the maximum performance values corresponding to all the sampled time points and the time pressures, the maximum performance-time pressure-time function curve is constructed with the time as an abscissa, the time pressures as another abscissa, and the maximum performance values as an ordinate.

Figure 5:
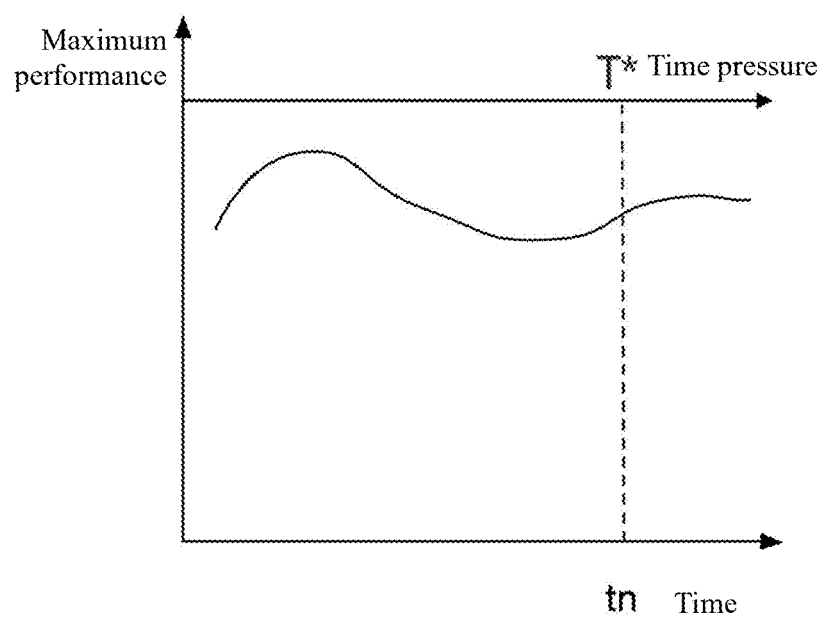
FIG. 5 is a diagram of a maximum performance-time pressure-time function curve provided by an embodiment.

Specifically, when the maximum performance-time pressure-time function curve is constructed, a blank graph is constructed with the time as an abscissa, the time pressures as another abscissa, and the maximum performance values as an ordinate, the maximum performance value corresponding to each sampled time point and the time pressure are used as a point to be filled in the blank graph, and a smooth curve is used to connect all the points to obtain the maximum performance-time pressure-time function curve as shown in FIG. 5. In this way, the maximum performance value corresponding to the sampled time point and the time pressure corresponding to the maximum performance value can be obtained simultaneously based on the maximum performance-time pressure-time function curve.

In S120, a response time of a next long-endurance operation is calculated based on a historical response time of man-machine interaction after the current long-endurance operation is completed.

In this embodiment, the response time of the next long-endurance operation may be predicted after the current long-endurance operation is completed. Specifically, calculating a response time of a next long-endurance operation based on a historical response time of man-machine interaction includes the steps below.

In (a), an average response time is calculated based on the historical response time.

Specifically, the historical response time may be a response time from the initial time of the long-endurance operation to the time of the current long-endurance operation, or may be a period of time from the time of the current long-endurance operation.

In (b), a corrected time is calculated based on a response time of the current long-endurance operation and a response time of a previous long-endurance operation.

Specifically, a difference between the response time of the current long-endurance operation and the response time of the previous long-endurance operation is used as the corrected time. The corrected time obtained in this way is more suitable for a response of the current pilot in a fatigue state.

In (c), the response time of the next long-endurance operation is calculated based on the average response time and the corrected time.

Specifically, a sum of the average response time and the corrected time can be used as the response time of the next long-endurance operation, or a corrected weight can be introduced, that is, a sum of a product of the corrected weight and the corrected time, and the average response time can be used as the response time of the next long-endurance operation. Specifically, the corrected weight can be derived from experience.

In S130, a maximum performance value corresponding to an initial time of the next long-endurance operation and a time pressure corresponding to the maximum performance value are calculated based on the maximum performance-time pressure-time function curve.

In this embodiment, after the maximum performance-time pressure-time function curve is obtained, the maximum performance value corresponding to the initial time of the next long-endurance operation and the time pressure corresponding to the maximum performance value may be obtained by searching for the maximum performance-time pressure-time function curve based on the initial time of the long-endurance operation. The process is fast in calculation.

In S140, an optimal reserved time corresponding to the maximum performance value is calculated based on the response time of the next long-endurance operation and the time pressure.

In this embodiment, after the time pressure corresponding to the maximum performance value is obtained, the reserved time corresponding to the time pressure can be calculated based on the time pressure definition and the response time of the next long-endurance operation calculated in S120.

Since the time pressure is the time pressure corresponding to the maximum performance value, the calculated reserved time is the optimal reserved time corresponding to the maximum performance value.

After the optimal reserved time is obtained, the reserved time corresponding to the long-endurance operation in an interactive system is updated based on the optimal reserved time, such that the actual perception time of the pilot during the next long-endurance operation is shorter than the optimal reserved time, thereby avoiding the human errors.

The man-machine interactive method for a long-endurance operation based on a dynamic time pressure provided by the above embodiment proposes a new design idea for the design of long-endurance man-machine interactive operation. A long-endurance dynamic time pressure concept is proposed. The reserved time of the system is reasonably planned based on the dynamic change of the response time of the pilot, and the time pressure of the long-endurance pilot is always control in a normal time pressure level, thereby reducing the human errors caused by accumulated fatigue, maximizing the performance of the man-machine interactive system, and improving the performance level of the pilot.

Figure 6:
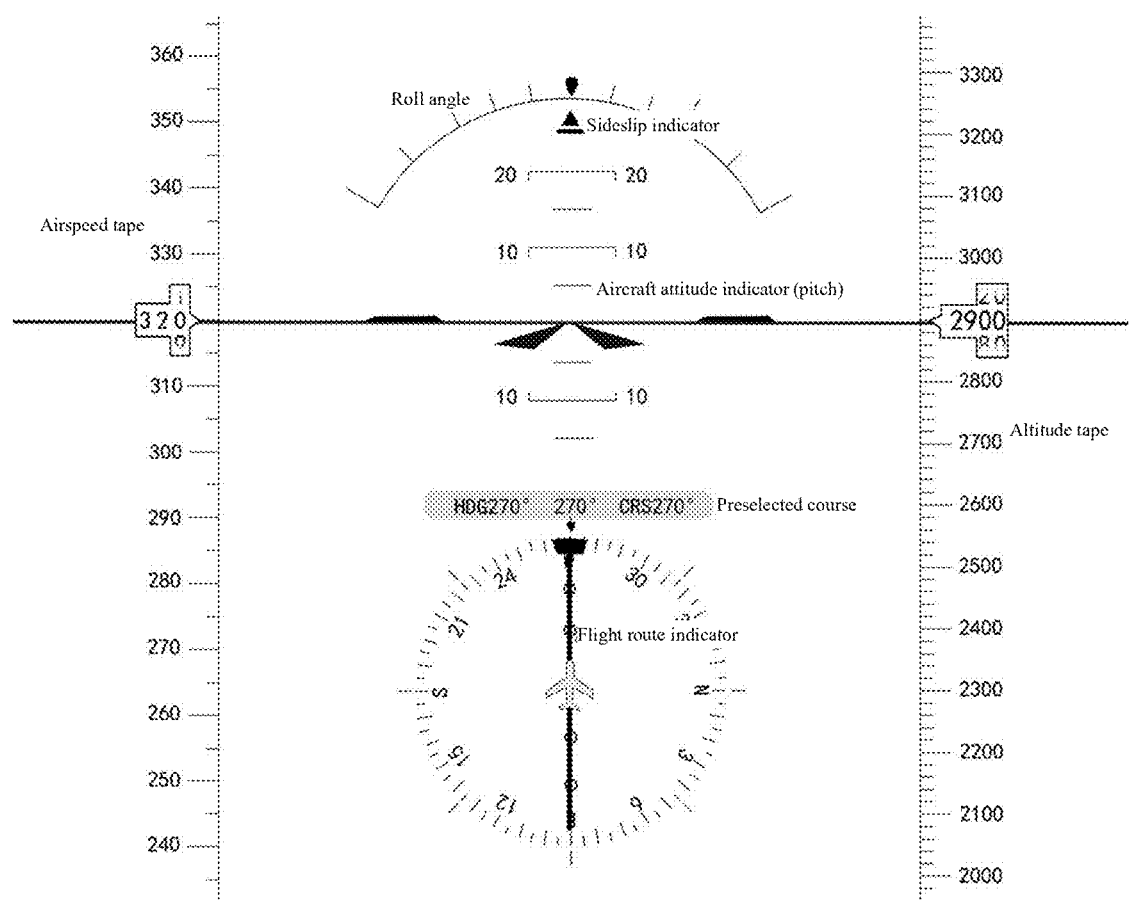
FIG. 6 shows information of a man-machine interactive interface provided by an embodiment.

This embodiment further provides a practical application example of the above man-machine interactive method for a long-endurance operation based on a dynamic time pressure. A long-endurance data reading mission is selected, a manual cruise flight monitoring operation implemented for 100 min is set, and there is no interval for rest midway. The operational performance data is extracted every 20 min as an interval and monitored for five times in total. Implementation condition setting is shown in Table 1. An implementer simulates flight mission monitoring and makes corresponding operations when finding abnormal information. A man-machine interactive interface is as shown in FIG. 6.

TABLE 1

| Interface information | Abnormal setting | Correct response | Reading rules |
|---|---|---|---|
| Airspeed | ≥400 km/h | 1 | A pointer is static, and a speed tape moves up and down |
| Roll angle | ≥20° | 2 | A sideslip indicator is static, and the pointer and a half-arc scale rotate about a center of an aircraft |
| Pitch angle | ≥20° | 3 | A central point of the aircraft is static, and a pitch tape moves up and down |
| Course angle | ≥45° | 4 | The pointer is static, and a dial plate of a flight route indicator rotates |
| Air pressure altitude | ≥3.00 km | 5 | The pointer is static, and an air pressure altitude tape moves up and down |

The no-time pressure group is set, and the monitored response times are 4.574_seconds, 5.689_seconds, 6.577_seconds, 5.945_seconds, and 5.985_seconds respectively under the condition of no reserved time, that is, no time pressure. According to the method provided by the present disclosure, the dynamic pressure group is set, and the optimal reserved times of the mission under the maximum performance at all the time points can be obtained and are 5.574_seconds, 5.623_seconds, 6.342_seconds, 6.557_seconds, and 6.970_seconds respectively. This embodiment further defines that the reserved time of the incremental time pressure group is always 5.574_seconds.

Experimental results are subjected to statistics based on different time pressures in three groups. It is as shown in Table 2 below. It can be seen from the data that the correct rate of the no-time pressure group is higher than the correct rate of the dynamic time pressure group and the correct rate of the incremental time pressure group, indicating that the time pressure has an important impact on long-endurance cognitive decision-making. The correct rate of the incremental time pressure group is reduced to more than 75% at 60 minutes; and the correct rate of the dynamic time pressure group is reduced to 78% at 100 minutes. That is, the dynamic time pressure regulation obtained by the method according to the present disclosure can effectively relieve the cumulative fatigue and the cognitive load caused by the incremental time pressure in conventional mission design, improve the operational performance, and guarantee the long-endurance flight safety.

TABLE 2

|  | 20 min | 40 min | 60 min | 80 min | 100 min |
|---|---|---|---|---|---|
| No-time pressure group | 95 ± 2.5 | 96 ± 2.1 | 94 ± 3.6 | 89 ± 3.9 | 87 ± 2.4 |
| Incremental time pressure group | 92 ± 1.9 | 84 ± 2.6 | 72 ± 4.8 | 52 ± 7.5 | 48 ± 7.9 |
| Dynamic time pressure group | 93 ± 2.2 | 90 ± 2.5 | 86 ± 3.7 | 80 ± 4.5 | 78 ± 6.4 |

Figure 7:
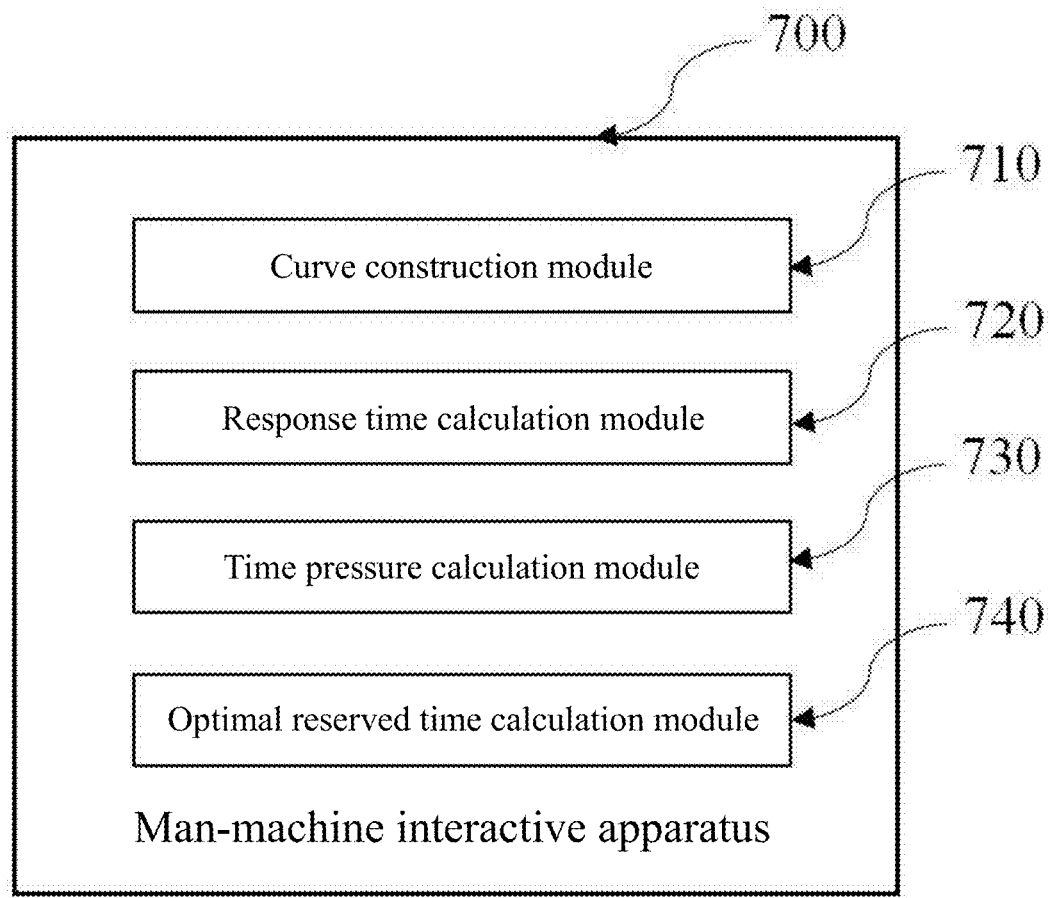
FIG. 7 is a schematic diagram of a structure of a man-machine interactive apparatus for a long-endurance operation based on a dynamic time pressure provided by an embodiment.

Based on the same inventive concept, as shown in FIG. 7, an embodiment further provides a man-machine interactive apparatus 700 for a long-endurance operation based on a dynamic time pressure, including a curve construction module 710, a response time calculation module 720, a time pressure calculation module 730, and an optimal reserved time calculation module 740.

The curve construction module 710 is configured to construct a maximum performance-time pressure-time function curve based on a performance-time pressure function curve corresponding to a long-endurance operation. Specifically, the construction process includes: sampling different time points on a time axis of the long-endurance operation, and constructing a performance-time pressure function curve corresponding to each of the sampled time points during the long-endurance operation; calculating a maximum performance value corresponding to the sampled time point and a time pressure corresponding to the maximum performance value based on the performance-time pressure function curve; and based on the maximum performance values corresponding to all the sampled time points and the time pressures, constructing the maximum performance-time pressure-time function curve with the time as an abscissa, the time pressures as another abscissa, and the maximum performance values as an ordinate.

The response time calculation module 720 is configured to calculate a response time of a next long-endurance operation based on a historical response time of man-machine interaction after the current long-endurance operation is completed. Specifically, an average response time is calculated based on the historical response time; a corrected time is calculated based on a response time of the current long-endurance operation and a response time of a previous long-endurance operation; and the response time of the next long-endurance operation is calculated based on the average response time and the corrected time.

The time pressure calculation module 730 is configured to calculate a maximum performance value corresponding to an initial time of the next long-endurance operation and a time pressure corresponding to the maximum performance value based on the maximum performance-time pressure-time function curve.

The optimal reserved time calculation module 740 is configured to calculate an optimal reserved time corresponding to the maximum performance value based on the response time of the next long-endurance operation and the time pressure.

It should be noted that when the man-machine interactive apparatus for a long-endurance operation based on a dynamic time pressure provided by the above embodiment performs man-machine interaction during the long-endurance operation based on the dynamic time pressure, the division of the above functional modules should be used as an example for description, and the above functions can be implemented with different functional modules according to requirements, that is, an internal structure of a terminal or a server can be divided into different functional modules to implement all or some of the functions described above. In addition, the man-machine interactive apparatus for a long-endurance operation based on a dynamic time pressure provided by the above embodiment and the embodiment of the man-machine interactive method for a long-endurance operation based on a dynamic time pressure belong to the same concept, and the specific implementation process thereof is detailed in the embodiment of the man-machine interactive method for a long-endurance operation based on a dynamic time pressure and thus will not be repeated herein.

According to the man-machine interactive apparatus for a long-endurance operation based on a dynamic time pressure provided by this embodiment, a reserved mission time on a time axis is obtained by calculating a time pressure level on the basis of researching the influence of the dynamic time pressure on human errors of long-endurance flight, thereby providing a new scientific design idea for a long-endurance man-machine interactive system, improving the overall performance level of the man-machine system, and reducing human errors caused by cumulative fatigue.

Based on the same inventive concept, an embodiment further provides a computing device, including a memory having an executable code stored therein, and one or more processors, where when executing the executable code, the one or more processors are configured to implement the above man-machine interactive method for a long-endurance operation based on a dynamic time pressure. The method specifically includes the following steps:

S110: constructing a maximum performance-time pressure-time function curve based on a performance-time pressure function curve corresponding to a long-endurance operation;

S120: calculating a response time of a next long-endurance operation based on a historical response time of man-machine interaction after the current long-endurance operation is completed;

S130: calculating a maximum performance value corresponding to an initial time of the next long-endurance operation and a time pressure corresponding to the maximum performance value based on the maximum performance-time pressure-time function curve; and S140: calculating an optimal reserved time corresponding to the maximum performance value based on the response time of the next long-endurance operation and the time pressure.

Figure 8:
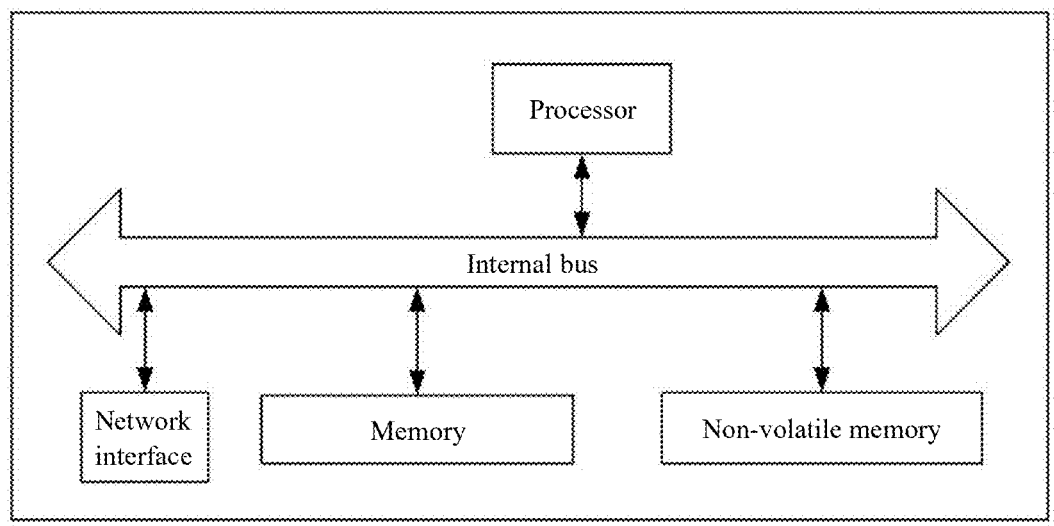
FIG. 8 is a schematic diagram of a structure of a computing device provided by an embodiment.

As shown in FIG. 8, at the hardware level, the computing device provided by this embodiment includes not only the processors and the memory, but also hardware required by other services such as an internal bus, a network interface, and a memory. The memory is a non-volatile memory, and the processor reads a corresponding computer program from the non-volatile memory into the memory and then runs it, so as to implement the above man-machine interactive method for a long-endurance operation described in S110 to S140. Certainly, in addition to software implementation, the present disclosure does not exclude other implementations, such as a logic device or a combination of software and hardware. That is to say, an executive subject of the following processing flow is not limited to each logic unit and may be hardware or the logic device.

Based on the same inventive concept, an embodiment further provides a computer-readable storage medium, having a program stored thereon, where when the program is executed by a processor, the above man-machine interactive method for a long-endurance operation based on a dynamic time pressure is implemented. The method specifically includes the following steps:

S110: constructing a maximum performance-time pressure-time function curve based on a performance-time pressure function curve corresponding to a long-endurance operation;

S120: calculating a response time of a next long-endurance operation based on a historical response time of man-machine interaction after the current long-endurance operation is completed;

S130: calculating a maximum performance value corresponding to an initial time of the next long-endurance operation and a time pressure corresponding to the maximum performance value based on the maximum performance-time pressure-time function curve; and S140: calculating an optimal reserved time corresponding to the maximum performance value based on the response time of the next long-endurance operation and the time pressure.

In this embodiment, the computer-readable medium includes persistent and non-persistent media and removable and non-removable media, which can implement information storage by any method or technology. Information may be computer-readable instructions, data structures, program modules, or other data. Examples of the computer storage medium include, but are not limited to, a phase change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memories, a compact disc read-only memory (CD-ROM), a digital versatile disc (DVD) or other optical storages, a cassette magnetic tape, and a magnetic tape and disk storage or other magnetic storage devices or any other non-transmission media, which may be used to store information accessible for the computing device. As defined herein, the computer-readable medium does not include transitory media, such as modulated data signals and carrier waves.

The specific embodiments mentioned above provide a detailed description of the technical solutions and beneficial effects of the present disclosure. It should be understood that the above are only the optimal embodiments of the present disclosure and are not intended to limit the present disclosure. Any modifications, supplements, and equivalent substitutions made within the scope of principle of the present disclosure should be included within the scope of protection of the present disclosure.

What is claimed is:

1. A man-machine interactive method for a long-endurance operation based on a dynamic time pressure, comprising the following steps:
constructing a maximum performance-time pressure-time function curve based on a performance-time pressure function curve corresponding to a long-endurance operation, comprising:
sampling different time points on a time axis of the long-endurance operation, and constructing a performance-time pressure function curve corresponding to each of the sampled time points during the long-endurance operation;
calculating a maximum performance value corresponding to the sampled time point and a time pressure corresponding to the maximum performance value based on the performance-time pressure function curve; and
based on the maximum performance values corresponding to all the sampled time points and the time pressures, constructing the maximum performance-time pressure-time function curve with the time as an abscissa, the time pressures as another abscissa, and the maximum performance values as an ordinate;
calculating a response time of a next long-endurance operation based on a historical response time of man-machine interaction after the current long-endurance operation is completed, comprising:
calculating an average response time based on the historical response time;
calculating a corrected time based on a response time of the current long-endurance operation and a response time of a previous long-endurance operation; and
calculating the response time of the next long-endurance operation based on the average response time and the corrected time;
calculating a maximum performance value corresponding to an initial time of the next long-endurance operation and a time pressure corresponding to the maximum performance value based on the maximum performance-time pressure-time function curve; and
calculating an optimal reserved time corresponding to the maximum performance value based on the response time of the next long-endurance operation and the time pressure.

2. The man-machine interactive method for a long-endurance operation based on a dynamic time pressure according to claim 1, wherein the calculating a corrected time based on a response time of the current long-endurance operation and a response time of a previous long-endurance operation comprises:
using a difference between the response time of the current long-endurance operation and the response time of the previous long-endurance operation as the corrected time.

3. The man-machine interactive method for a long-endurance operation based on a dynamic time pressure according to claim 1, further comprising: updating a reserved time corresponding to the long-endurance operation in an interactive system based on the optimal reserved time.

4. A computing device, comprising a memory having an executable code stored therein, and one or more processors, wherein when executing the executable code, the one or more processors are configured to implement the man-machine interactive method for a long-endurance operation based on a dynamic time pressure according to claim 1.

5. A non-transitory computer-readable storage medium, having a program stored thereon, wherein when the program is executed by a processor, the man-machine interactive method for a long-endurance operation based on a dynamic time pressure according to claim 1.

* * * * *